Patented May 12, 1942

2,282,646

UNITED STATES PATENT OFFICE 2,282,646

RICINOLEIC ACID ESTER

Melvin De Groote, University City, and Bernhard Keiser, Webster Groves, Mo., assignors to Petrolite Corporation, Ltd., Wilmington, Del., a corporation of Delaware No Drawing. Application June 14, 1941,
Serial No. 398,145

3 Claims. (Cl. 260—404)

This application is a continuation, in part, of our co-pending application Serial No. 342,718, filed June 27, 1940, now U. S. Patent No. 2,250,405, dated July 22, 1941, which is concerned with a process for resolving petroleum emulsions, said process being characterized by the fact that it employs as a demulsifier, certain acylated amino derivatives of the kind described in said co-pending application, and includes generically inter alia such new compositions or chemical compounds which are herein contemplated in the present instance as new compositions of matter, or new chemical compounds.

The principal object of our present invention is to provide a new material or composition of matter that is particularly adapted for use as a demulsifier in the resolution of crude oil emulsions, but which may be used for other purposes or for other uses in other arts that we have not yet completely investigated.

Another object of our invention is to provide a practicable method for manufacturing or producing said new material or composition of matter.

The new material or composition of matter which constitutes our present invention, may also be used as a break inducer in doctor treatment of the kind intended to sweeten gasoline. See U. S. Patent No. 2,157,223, dated May 9, 1939, to Sutton. Certain of the compounds which represent different examples of the new composition of matter herein described, are also of value as surface tension depressants in the acidization of calcareous oil-bearing strata by means of strong mineral acid, such as hydrochloric acid. Similarly, some of the new compounds herein described are effective as surface tension depressants or wetting agents in the flooding of exhausted oil-bearing strata.

We have found that if the esterification product derived by reaction between ricinoleic acid or its obvious functional equivalent, i. e., a chemical compound capable of introducing the ricinoleyl radical, is reacted with a suitably selected derivative of tris (hydroxymethyl) aminomethane or a homolog or anolog thereof, as subsequently described, one obtains a new composition of matter which has unusual properties and is commercially valuable, particularly in the demulsification of petroleum emulsions.

Ricinoleic acid is most readily available in the form of castor oil, which contains about 85% triricinolein. Instead of ricinoleic acid, one may employ monoricinolein, diricinolein, methyl ricinoleate, ethyl ricinoleate, benzyl ricinoleate, cyclohexyl ricinoleate, etc. Similarly, one may employ polyricinoleic acid, such as diricinoleic acid, triricinoleic, and tetraricinoleic acid; or one may employ the dibasic type of diricinoleic acid. Obviously, ricinoleic acid esters can be derived from polyhydric alcohols other than glycerol, for instance, from the various glycols, polyglycols, polyglycerols, methyl glycerol, and the like. Ordinarily, one would employ the cheapest source of the ricinoleic acid radical, which is castor oil. Slightly blown castor oil or the like may be used.

Castor oil can be treated with one mole or two moles of glycerol, or any intermediate quantity, to produce a material consisting largely of diricinolein, monoricinolein, and some triricinolein, with perhaps a small amount of free glycerol. Such material is commonly referred to as superglycerinated castor oil, or superglycerinated triricinolein. Such mixture may be considered as a typical ricinoleic acid body, or a reactant capable of furnishing a ricinoleyl radical.

Having indicated the variety of ricinoleic acid compounds which may be employed to produce the new compound or material herein contemplated, reference will now be made to the type of amine intended for reaction. It is well known that paraffins can be treated with nitric acid, so as to produce nitroparaffins or nitrites. Such nitroparaffins can be treated with aldehydes, particularly aliphatic aldehydes, having four carbon atoms or less, so as to produce nitroparaffins in which one, two or three hydroxyl alkyl radicals have been introduced, and particularly characterized by the fact that such nitroparaffins may have two or three alkylol groups attached to the same carbon atom. Such nitroparaffins can readily be converted into the corresponding amine. See "Chemical Industries," volume 45, No. 7, pages 664–668, December, 1939. See also "Industrial and Engineering Chemistry," volume 32, No. 1, page 34.

Some known examples of amines of the kind described are:

2-amino-2-methyl-1,3-propanediol

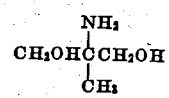

2-amino-2-ethyl-1,3-propanediol

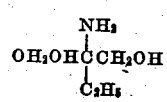

Tris (hydroxymethyl) aminomethane

Such amines may be indicated by the following formula type:

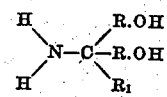

in which R represents a divalent radical, such as the methylene radical, and $R_1$ may be a hydrogen atom or the same as $OH.R$, or may represent a monovalent hydrocarbon radical, particularly an alkyl radical. In other words, the nature of $R_1$ may vary with the particular paraffin selected, and the molal reaction ratio between the nitroparaffin and aldehyde in the event the paraffin is methane. Needless to say, such reactions between an aldehyde and a nitroparaffin may yield a monohydric alcohol, as distinguished from a nitro-diol or nitro-triol, in the event the paraffin is methane. Such monohydroxylated compound can be converted into an alkylolamine. Such alkylolamine, as, for example, 2-amino-1-butanol, is not contemplated for use as a reactant in the manufacture of the new chemical compounds constituting our present invention. Of various aldehydes employed for reaction with the nitroparaffins, formaldehyde, acetaldehyde, and butyraldehyde are to be preferred, with formaldehyde being particularly desirable. Cyclic aldehydes, such as benzaldehyde or hexahydrobenzaldehyde, give very inferior yields.

Having obtained an amine of the kind above described, which is a primary amine, it can readily be converted into a secondary or a tertiary amine by any of the procedures commonly employed for introducing an alkyl or similar monovalent hydrocarbon radical. By means of suitable alkylating agents, one may introduce alkyl groups, aryl radicals, aralkyl radicals, alicyclic radicals, hydroxy hydrocarbon radicals, and the like. Convenient reagents for such reactions include alkyl chlorides, such as butyl chloride, benzyl chloride, phenyl chloride, ethyl bromide, glyceryl chlorhydrin, ethylene chlorhydrin, ethylene oxide, propylene oxide, diethyl sylfate, ethyl chloracetate, etc. The result of an alkylation reaction or the equivalent, usually is the formation of an amine salt, such as the amine hydrochloride. The liberation of the free amine depends on conventional treatment with caustic soda or the like. Treatment with a reactive alkylene oxide, such as ethylene oxide, propylene oxide, and the like does not result in the formation of a salt, and thus in many ways is a more suitable procedure. It should be noted that the hydroxyl, which is part of the radical $OH.R$, is reactive towards alkylating agents. In some instances, perhaps, such hydroxyl hydrogen atom is more reactive than is the amino hydrogen atom, and perhaps in other instances, not so reactive. The speed of the reactions depends, of course, on the reactants selected and the conditions of the reaction.

If ethylene oxide, propylene oxide, or the like are used to react with the hydrogen atom previously referred to, then the reaction proceeds as follows:

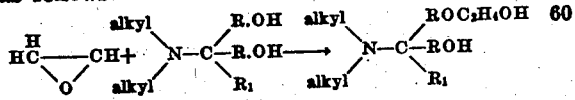

Thus, examining the class of compounds in the broadest aspect, they may be rewritten as:

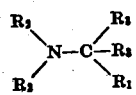

in which $R_3$ represents a monovalent alkylol radical, preferably an alkylol radical, or may be a hydroxylated oxyhydrocarbon radical, which, in addition to having at least one hydroxyl radical, has the carbon atom chain interrupted at least once by an oxygen atom. Reactants such as glycerol monochlorhydrin or the corresponding chlorhydrins derived from di- or triglycerol, would permit the introduction of radicals containing more than one hydroxyl group, and being interrupted more than once by an oxygen atom. $R_1$ may be the same as $R_3$, or may be a hydrogen atom or any alkyl radical. $R_2$ represents a monovalent hydrocarbon radical, or may represent any alkylol radical, hydroxy oxyhydrocarbon radical, characterized by having a hydroxyl radical, and having a carbon atom chain interrupted at least once by oxygen, or a radical derived by hypothetical removal of alpha hydrogen atom from a carboxy acid ester. As hereinafter pointed out, $R_2$ may even be a hydrogen atom, that is, one need not necessarily employ a tertiary amine, provided that one takes the required precaution to introduce a ricinoleyl radical in ester form. Due to its availability, the amine, which we prefer to employ as an initial reactant or primary raw material, is tris(hydroxymethyl) aminomethane. Our preferred "alkylating" reactant is ethylene oxide.

It is obvious, in view of what has been said herein, as well as what has been said in our aforementioned co-pending application Serial No. 342,718, dated June 27, 1940, that acylation products, if derived from primary or secondary amines, may be of the type in which all acyl radicals are present in the amido form. Similarly, compounds may be of the type in which all the acyl radicals present are in the ester form. It is also possible to have a series of compounds which exhibit both the amido and the ester form. However, in the present instance, that is to say, as far as the new compositions of matter are concerned, this application is concerned only with derivatives in which there is at least one occurrence of the ricinoleyl radical in the ester form, replacing a hydroxyl hydrogen atom of a hydroxy hydrocarbon group.

There must be present in the amine reactant at least two hydroxy hydrocarbon groups attached to the same carbon atom; and obviously there may be a greater number, but not all attached to the same carbon atom. For instance, previous reference has been made to the fact that the present invention is not concerned with derivatives of compounds derived by the use of 2-amino-1-butanol as a reactant, but that the initial or the primary reactants must contain at least two alkylol groups or the equivalent. Previous reference also has been made to the reaction involving a product such as tris(hydroxymethyl)aminomethane and an oxyalkylating agent, such as ethylene oxide. Obviously, such reaction could result in the formation of a compound having more than two alkylol radicals, and not necessarily attached to the same carbon atom.

If, in addition to the presence of two or more alcoholiform hydroxyl groups, there is also present an amino hydrogen atom, then of course an acylation reaction may involve either the amino hydrogen atom, or a hydrogen atom of a hydroxyl group. In order to insure the presence of a ricinoleyl radical in ester form, it means that one must either conduct the reaction so that the ricinoleyl radical introduced is combined in the ester form, or else one must introduce more ricinoleyl radicals than there are present amino hydrogen atoms. All of this, of course, is apparent to a person skilled in the art concerned with acylation reactions of the kind referred to;

and one can select reactants and conditions of reaction so as to obtain primarily one particular type or primarily another particular type. With this in mind, in the hereto appended claims the expression "basic hydroxy amine" is employed to designate such amine which is reactive in regard to reactions of the kind described, and is basic in character, due to the absence of any aryl radicals or acyl (ricinoleyl) radicals directly linked to the nitrogen atom. Although the introductory reference is concerned largely with tertiary amines, it is to be noted that an amine which is not a tertiary amine, for instance, a secondary amine, might be employed, if the reaction is conducted in such a manner as to obtain esterification instead of amidification, or, at least, esterification, in addition to amidification. See subsequent reference to U. S. Patent No. 2,151,788, dated March 28, 1939, to Mauersberger.

*Example 1*

A molecular proportion of tris(hydroxymethyl) methyl dibutylamine is treated with one mole of ricinoleic acid and heated until one obtains an ester with the elimination of water. Insofar that the original amine employed contains no replaceable amino hydrogen atom, obviously, the only compound obtainable is the ester form.

*Example 2*

A molecular proportion of tris(hydroxymethyl) methyl butylamine is treated with one mole of ricinoleic acid and heated until one obtains an ester with the elimination of water.

*Example 3*

One molecular proportion of tris(hydroxymethyl)aminomethane is treated with two moles of ricinoleic acid until one forms the amide ester. Theoretically, one can form a secondary amide, i. e., an amide in which two amino hydrogen atoms attached to the same amino nitrogen atom have been replaced by an acyl radical. However, the introduction of the second amide group attached to the same amino nitrogen, is rather difficult to realize under ordinary conditions of reaction; and thus, actually one introduces the second acyl group in the ester form.

*Example 4*

A molecular proportion of tris(hydroxymethyl)methyl butylamine is treated with one mole of ethyl ricinoleate. The esters preferentially react with replacement of an amino hydrogen atom, rather than an alcoholiform hydroxyl hydrogen atom. Thus, the above reaction can be conducted in a manner to produce the amide in almost complete absence of the ester. (See subsequent reference to U. S. Patent No. 2,151,788, dated March 28, 1939, to Mauersberger.)

*Example 5*

One mole of tris(hydroxymethyl)aminomethane is treated with one mole of ricinoleoamide in the conventional manner to eliminate ammonia and form the ricinoleic acid amide of tris-(hydroxymethyl)aminomethane. (See subsequent reference to U. S. Patent No. 2,151,788, dated March 28, 1939, to Mauersberger.)

*Example 6*

One mole of tris(hydroxymethyl)aminomethane is treated with several moles of ethylene oxide, for instance, 3–12 moles of ethylene oxide, so as to obtain an amine of the following composition:

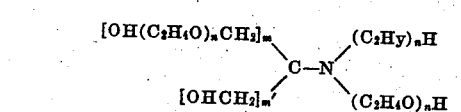

in which $n$ is a small whole number not over 5, and $m$ and $m'$ represent the numerals 0, 1, 2 or 3, with the proviso that $m+m'=3$. As is well known, in a reaction of this kind, particularly when conducted so as to yield a tertiary amine, one cannot completely control the points of reaction at which the oxyalkyl radical is introduced. For instance, the two hydroxy-ether radicals which replace the amino hydrogen atoms may contain the same number of ether linkages, and may not. This is indicated in the above formula. Similarly, while such amine is being converted into a tertiary amine by means of an oxyalkylating agent, such as ethylene oxide, propylene oxide, glycid or the like, the hydroxyl radical of the methylol group or groups is oxyalkylated. Such oxyalkylation may not be limited to a single methylol group.

Oxyalkylation is conducted in the same manner as employed for the oxyalkylation of monoethanolamine, diethanolamine, or triethanolamine. Generally speaking, a small amount of alkali, for instance, 0.5% of caustic soda, is added as a catalyst. Such reactions are conducted under pressure, and the temperature is generally below 200° C., but above the melting point of the amine. In presence of a suitable inert solvent, oxyethylation may be conducted at a temperature below 200° C.

A product of the kind above described, or even the comparable secondary amine, can be treated with ricinoleic acid or the like to give a suitable ester of the kind herein contemplated.

However, other means may be employed to obtain predominantly one type or the other. For instance, if one has the amide or a mixture of the amide and ester type, one can convert the same to the ester type by reaction with a dilute acid. The reason such procedure can be employed is that apparently there is an equilibrium between the amide type and the ester type, especially when heated; and the ester type is basic and dissolves in the acid, thus upsetting the equilibrium. For instance, reference is made to U. S. Patent No. 2,151,788, dated March 28, 1939, to Mauersberger, in which such conversion is illustrated, for instance, in connection with an amide derived from monoethanolamine and oleic acid by use of 85% lactic acid. Such procedure is applicable in connection with the intermediate compounds herein contemplated, as exemplified by Examples 4 and 5.

It is hardly necessary to indicate that various members of the class previously described are characterized by the presence of a basic or moderately basic amino type of compound naturally can be used as such (without reaction with water); or it can be used in the form of a base, that is, the compound derived by reaction with water, or in the form of a salt, for instance, the acetate or the salt derived by reaction with a strong mineral acid, such as hydrochloric acid or the like.

In using the above described new material or composition of matter, as a demulsifier to resolve a petroleum emulsion, the demulsifier is brought into contact with or caused to act upon the emulsion to be treated in any of the various ways, or by any of the various apparatus now generally used to resolve or break petroleum emulsions with a chemical reagent, the above procedure being used either alone, or in combination with other demulsifying procedure, such as the electrical dehydration process.

Having thus described our invention, what we claim as new and desire to secure by Letters Patent is:

1. A ricinoleic acid ester of an amino alcohol of the formula

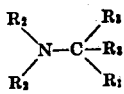

in which $R_3$ is selected from the class consisting of alkylol and alkylol-ether radicals; $R_1$ is selected from the class consisting of hydrogen atoms, alkyl radicals, alkylol radicals and alkylolether radicals; and $R_2$ represents a member of the class consisting of hydrogen atoms, alkyl radicals, alkylol radicals and alkylol-ether radicals.

2. A ricinoleic acid ester of an amino alcohol of the following:

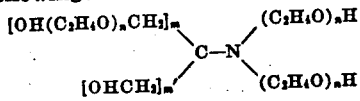

in which $n$ is a small whole number not over 5, and $m$ and $m'$ represent the numerals 0, 1, 2 or 3, with the proviso that $m+m'=3$; said amine being derived by reaction between tris(hydroxymethyl) aminomethane and ethylene oxide, in the proportion of not less than 3 and not more than 12 moles of ethylene oxide for each mole of tris(hydroxymethyl) aminomethane.

3. A method for the manufacture of the chemical compound contemplated in claim 1, consisting in subjecting tris(hydroxymethyl) aminomethane to oxyalkylation by means of ethylene oxide; said ethylene oxide being employed in the proportion of at least three and not more than 12 moles for each mole of the amine; said oxyalkylation being followed by esterification with ricinoleic acid.

MELVIN DE GROOTE.
BERNHARD KEISER.